United States Patent [19]

Thoma et al.

[11] 4,389,018
[45] Jun. 21, 1983

[54] FUEL INJECTION NOZZLE FOR INTERNAL COMBUSTION ENGINES

[75] Inventors: Frank Thoma; Karlheinz Hoffmann; Günter Seiler, all of Stuttgart, Fed. Rep. of Germany

[73] Assignee: Daimler-Benz Aktiengesellschaft, Stuttgart, Fed. Rep. of Germany

[21] Appl. No.: 243,000

[22] Filed: Mar. 12, 1981

[30] Foreign Application Priority Data

Mar. 12, 1980 [DE] Fed. Rep. of Germany ....... 3009461

[51] Int. Cl.³ ............................................. F02M 61/16
[52] U.S. Cl. .................................................. 239/533.3
[58] Field of Search ......................... 239/533.2-533.11, 239/584

[56] References Cited

U.S. PATENT DOCUMENTS 2,381,423  8/1945  Buck ..................................... 239/584
3,511,443  5/1970  Glikin et al. .................. 239/533.6 X Primary Examiner—Andres Kashnikow
Attorney, Agent, or Firm—Craig & Burns

[57] ABSTRACT

A fuel injection nozzle for internal combustion engines, with the nozzle including a spring loaded nozzle needle guided in a nozzle body and controlling an injection orifice. An annular chamber is formed on the side of the nozzle needle facing away from the injection orifice, with the annular chamber being formed by the nozzle needle and nozzle body along with an intermediate member of the injection nozzle. The intermediate member includes a needle stop for the nozzle needle. An elastic sealing ring is guided on the nozzle needle and is arranged in the annular chamber. The sealing ring is supported against a surface forming the needle stop.

21 Claims, 6 Drawing Figures

FUEL INJECTION NOZZLE FOR INTERNAL COMBUSTION ENGINES

The present invention relates to a nozzle and, more particularly, to a fuel injection nozzle for internal combustion engines, with the nozzle including a spring-loaded nozzle needle, guided within a nozzle body, for controlling an injection orifice or opening, and with an annular chamber formed on the side of the nozzle needle facing away from the injection opening. By means of the nozzle needle and nozzle body, with the annular chamber being defined by an intermediate or connecting member of the injection nozzle, which member is provided with a needle stop.

Injection nozzles of air-compressing fuel injected internal combustion engines have been proposed which include a nozzle needle guided with a small amount of play within nozzle bodies. An injection pressure ambient in the injection nozzle is contained toward the outside of the nozzle by way of a closing spring chamber and relief duct solely by the narrow play thereby resulting in unavoidable fuel leakage losses. Due to manufacturing tolerances and the concomitant differing needle clearances, different leakage rates are encountered from one injection nozzle to the next injection nozzle in an internal combustion engine. Since leakage losses must be deducted or subtracted from the quantity of fuel injected, the amounts of fuel injected into the individual cylinders of the internal combustion engine may also likewise differ greatly from one injection opening to the next because of the varying nozzle leakage amounts presupposing an exact uniformity of the injection pump. The differences in the amounts of fuel injected from cylinder to cylinder naturally lead to a fluctuating torque curve of the engine during an operating cycle thereby resulting in the initiating of a rotary oscillation of a block of the engine of the motor vehicle which is transmitted into a so-called "shaking" of the motor vehicle which is unpleasant for both driver and occupants.

In Offenlegungsschrift No. 2,711,392, an injection nozzle is provided with a satisfactory seal between the pressure chamber and the pressure-relieved chambers. The valve needle, pertaining to a bipartite nozzle needle, is equipped with a piston-like section guided in the hollow needle in a portion having a larger diameter. This portion of the hollow needle is precision machined so that the piston-like section of the valve needle is sealingly guided. In contradistinction thereto, the part of a hollow needle which is slidingly guided in the nozzle body is merely subjected to an extremely fine machining along an outer jacket surface.

The aim underlying the present invention essentially resides in providing a fuel injection nozzle which has an improved seal between pressure chambers or spaces and pressure relieved chambers.

In accordance with advantageous features of the present invention, an elastically constructed sealing ring, guided on the nozzle needle, is arranged in the annular chamber, with the sealing ring being supported against a surface constituting the needle stop.

By virtue of the above-noted simple features of the present invention, it is superfluous to carryout precision machining at locations of the injection nozzle which are subject to leakage oil so that a permanent and effective seal has been ensured.

In accordance with further advantageous features of the present invention, the sealing ring is guided by a press fit with minor contact pressure on the nozzle needle. A supporting ring may be provided for contacting a wall of the annular chamber between the needle stop and the sealing ring.

Advantageously, a spring element may be arranged in the annular chamber, with the spring element constantly urging the sealing ring against the supporting ring. The spring element may be fashioned as an annular corrugated spring.

In accordance with further advantageous features of the present invention, the sealing element and the sealing ring may be constructed in one piece with the resilient part being provided with yielding spring nubs resting on a shoulder which defines the annular chamber and is located oppositely to the needle stop.

According to the present invention, the sealing ring and supporting ring may be combined into one structural unit. Moreover, the supporting ring may simultaneously form a friction ring. Additionally, the supporting ring of the structural unit may simultaneously be a mounting ring which is held in a cylindrical recess in the nozzle body.

Advantageously, a rubber-elastic lip-type sealing ring may be provided which firmly contacts the walls of the annular chamber, with the sealing lip of this ring being guided on the nozzle needle. A metal ring may be vulcanized into the lip type sealing ring above the sealing lip.

Accordingly, it is an object of the present invention to provide a fuel injection nozzle for internal combustion engines which avoids, by simple means, shortcomings and disadvantages encountered in the prior art.

Another object of the present invention resides in providing a fuel injection nozzle for internal combustion engines which is simple in construction and therefore relatively inexpensive to manufacture.

Yet another object of the present invention resides in providing a fuel injection valve for internal combustion engines which minimizes if not avoids a variation in the amounts of fuel injected into the individual cylinders of the internal combustion engine.

A still further object of the present invention resides in providing a fuel injection nozzle for internal combustion engines which minimizes fuel leakage losses.

Yet another object of the present invention resides in providing a fuel injection nozzle for internal combustion engines which functions realiably under all operating loads or ranges of the engine.

These and other objects, features, and advantages of the present invention will become more apparent from the following description when taken in connection with the accompanying drawings which show, for the purposes of illustration only, several embodiments in accordance with the present invention, and wherein.

Figure 1:
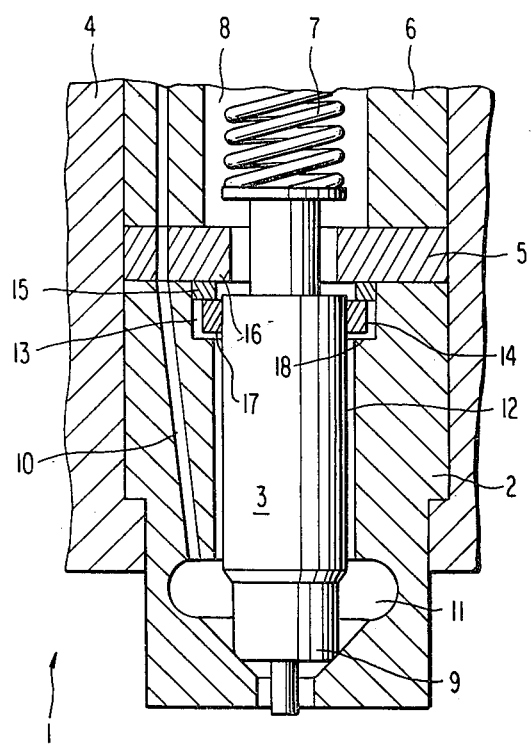
FIG. 1 is a longitudinal cross sectional view of a fuel injection nozzle constructed in accordance with the present invention with a supporting ring a sealing ring but without spring loading.

Referring now to the drawings wherein like reference numerals are used throughout the various views to designate like parts and, more particularly, to FIG. 1, according to this figure, a fuel injection nozzle generally designated by the reference numeral 1 for an air-compressing fuel-injected internal combustion engine includes a nozzle needle 3 longitudinally displaceably guided in a nozzle body 2 and a cap nut 4 by means of which the nozzle body 2 is tightened through an intermediate connecting member 5 against a nozzle holder 6. A closing spring 7 is disposed in a spring chamber 8, with the spring 7 being adapted to urge the nozzle needle 3 onto a valve seat 9 arranged at the nozzle body 2. The nozzle needle 3 is lifted off the valve seat 9 only once fuel is being conveyed from a fuel injection pump (not shown) through a pressure duct 10 into a high pressure chamber 11.

The high pressure chamber 11 is in communication with a guide ring slot 12 formed between the nozzle body 2 and nozzle needle 3. An annular chamber 13 is disposed following the guide ring slot 12, with the annular chamber 13 being defined by the intermediate member 5. A sealing ring 14 of an elastic material which is fuel and heat resistant is arranged in the annular chamber 13, with the sealing ring being guided on the nozzle needle 3 with a press fit which is effective with low pressure or with minor contact pressure. Due to an effective fuel pressure of about 20 bar effective from the guide ring slots 12, the sealing ring 14 is urged radially against the nozzle needle 3 and axially against a supporting ring 15 which is arranged in the annular chamber 13 so that a radially and axially effective seal is produced.

The supporting ring 15 contacts the wall of the annular chamber 13 and is supported against the surface 16 of the intermediate member 5, which surfaces serves as a needle stop or abutment.

A small slot or gap is provided on a high pressure side end face 17 of the sealing ring 14 and a shoulder 18 of the nozzle body 2 to avoid axial squeezing and thus any impeding of a radial movement of the sealing ring 14. However, it is also possible, as shown in FIG. 2, to arrange a slot receiving a spring element 19 in lieu of the narrow slot or gap.

Figure 2:
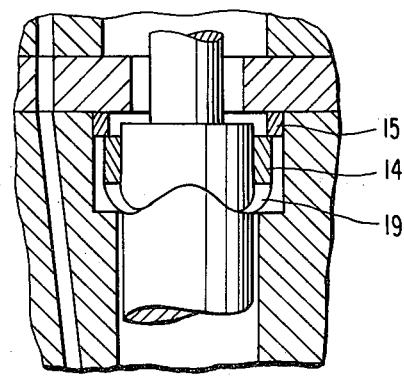
FIG. 2 is a partial longitudinal cross sectional view of the fuel injection nozzle in accordance with the present invention with a supporting ring and spring-loaded sealing ring.
Figure 3:
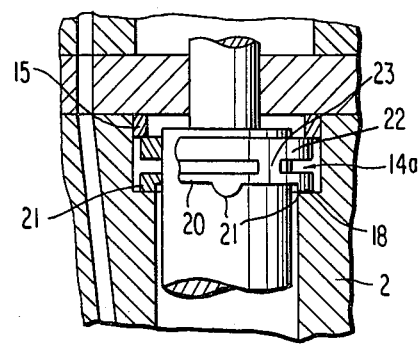
FIG. 3 is a partial longitudinal cross sectional view of a fuel injection nozzle in accordance with the present invention with a supporting ring and a sealing ring fashioned as a resilient element.

By constructing the spring element 19 as an annular corrugated spring as shown most clearly in FIG. 2, the sealing ring, during a return of the nozzle needle 3 in a closing phase, is not pulled along but is rather constantly urged against the supporting ring 15 in injection systems wherein a specific minimum pressure in the pressure chamber 11 is not always ensured toward the end of an injection step or phase. As shown in FIG. 3, a sealing ring generally designated by the reference numeral 14a may be provided which simultaneously constitutes a spring element, with a resilient ring portion 20 of the sealing ring 14 being provided with resilient nubs 21 resting on the shoulder 18. The resilient spring portion 20 and a top positioned main part 22 of the sealing ring 14 are joined by webs 23.

Figure 4:
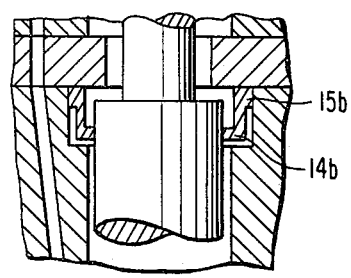
FIG. 4 is a partial longitudinal cross sectional view of a fuel injection nozzle in accordance with the present invention wherein a sealing ring and supporting ring form a structural unit, with the supporting ring being fashioned as a friction ring.

As shown in FIG. 4, it is also possible to provide a supporting ring 15b which may, at the same time, form a friction ring firmly contacting a wall of the annular chamber 13, with the supporting ring forming a structural unit with the sealing ring 14b. By virtue of the constructional features of FIG. 4, it is not necessary to supply a separate spring element.

Figure 5:
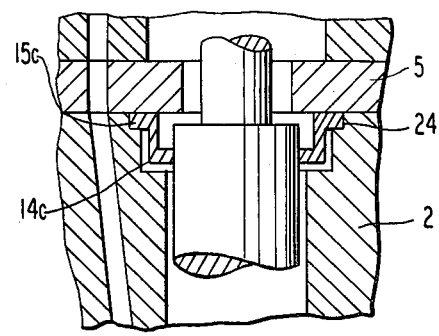
FIG. 5 is a partial longitudinal cross sectional view of a fuel injection nozzle in accordance with the present invention with the supporting ring being fashioned as a holding or mounting ring.

As shown in FIG. 5, a supporting ring 15c may be provided which simultaneously forms a mounting ring which is clamped by the intermediate member 15 within a cylindrical recess 24 provided in the nozzle body 2. The supporting ring 15c is formed as a single structural unit with a sealing ring 14c. As with the construction of FIG. 4, the arrangement of FIG. 5 renders the provision of a spring element superfluous.

Figure 6:
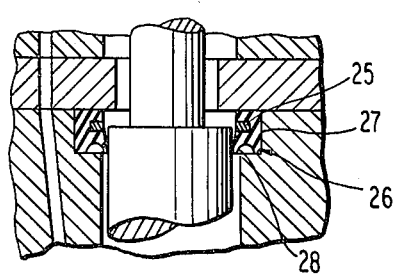
FIG. 6 is a partial longitudinal cross sectional view of an injection nozzle in accordance with the present invention provided with a lip-type sealing ring.

As shown in FIG. 6, a lip type sealing ring or lip seal generally designated by the reference numeral 26 of a rubber-elastic material may be arranged in the annular chamber 13. An outer jacket surface 27 of the sealing ring 26 is urged against a wall of the annular chamber 13 and is guided with its interiorly located lip 28 on the nozzle needle 3. A metal ring 25 is vulcanized into the sealing ring 26 at a position above the lip 28. The metal ring 25 supports the sealing ring 26 in a radial direction.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, characterized in that an elastic sealing means is guided on the nozzle needle means and is arranged in the annular chamber means at a distance from the wall thereof for admitting fluid pressure to press the elastic sealing means against the nozzle needle means to effect radial and axial sealing, and means is provided for supporting the elastic sealing means against the surface of the stop means.

2. A fuel injection nozzle according to claim 1, characterized in that spring means are provided for normally urging the nozzle needle means into a position closing the injection orifice means, means are provided for securing the nozzle body means in a nozzle holder means, and in that an intermediate member is interposed between the nozzle holder means and nozzle body means for defining a portion of the annular chamber means.

3. A fuel injection nozzle according to claim 2, characterized in that the intermediate member forms the surface of the stop means against which the elastic sealing means is supported.

4. A fuel injection nozzle according to one of claims 1, 2, or 3, characterized in that the sealing means includes an elastic ring member press fitted on the nozzle needle means with a minor contact pressure.

5. A fuel injection nozzle according to claim 4, characterized in that the elastic sealing means further includes a supporting ring contacting an inner wall of the annular chamber means, the supporting ring is interposed between the stop means and the elastic ring member.

6. A fuel injection nozzle according to one of claims 1, 2, or 3, characterized in that the elastic sealing means includes an elastic ring member and a supporting ring combined into a single structural unit.

7. A fuel injection nozzle according to claim 6 characterized in that the supporting ring forms a friction ring firmly contacting an inner wall of the annular chamber means.

8. A fuel injection nozzle according to claim 1, wherein the elastic sealing means is configured for providing
 a gap between the high pressure end face thereof and a shoulder of the nozzle body means.

9. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, an elastic sealing means is guided on the nozzle needle means and is arranged in the annular chamber means, and the elastic sealing means is supported against the surface of the stop means,
 the sealing means includes an elastic ring member press fitted on the nozzle needle means with a minor contact pressure,
 the elastic sealing means further includes a supporting ring contacting between the stop means and the elastic ring member,
 characterized in that a spring means is disposed in the annular chamber means for constantly urging the elastic ring member against the supporting ring.

10. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, an elastic sealing means is guided on the nozzle needle means and is arranged in the annular chamber means, the elastic sealing means is supported against the surface of the stop means,
 spring means are provided for normally urging the nozzle needle means into a position closing the injection orifice means, means are provided for securing the nozzle body means in a nozzle holder means, and an intermediate member is interposed between the nozzle holder means and nozzle body means for defining a portion of the annular chamber means,
 the sealing means includes an elastic ring member press fitted on the nozzle needle means with a minor contact pressure,
 the elastic sealing means further includes a supporting ring contacting between the stop means and the elastic ring member, and characterized in that
 a spring means is disposed in the annular chamber means for constantly urging the elastic ring member against the supporting ring.

11. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, an elastic sealing means is guided on the nozzle needle means and is arranged in the annular chamber means, and the elastic sealing means is supported against the surface of the stop means,
 spring means are provided for normally urging the nozzle needle means into a position closing the injection orifice means, means are provided for securing the nozzle body means in a nozzle holder means, and an intermediate member is interposed between the nozzle holder means and nozzle body means for defining a portion of the annular chamber means,
 the intermediate member forms the surface of the stop means against which the elastic sealing means is supported,
 the sealing means includes an elastic ring member press fitted on the nozzle needle means with a minor contact pressure,
 the elastic sealing means further includes a supporting ring contacting between the stop means and the elastic ring member, and characterized in that
 a spring means is disposed in the annular chamber means for constantly urging the elastic ring member against the supporting ring.

12. A fuel injection nozzle according to one of claims 9, 10 or 11, characterized in that the spring means disposed in the annular chamber means is an annular corrugated spring element.

13. A fuel injection nozzle according to one of claims 9, 10 or 11 characterized in that the spring means disposed in the annular chamber means and the elastic ring member are formed in one piece, the annular chamber means includes a shoulder means disposed oppositely the surface of the stop means, and in that yielding spring nubs are provided on the elastic ring member which rest on the shoulder means.

14. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, an elastic sealing means is guided on the nozzle needle means and is arranged in the annular chamber means, and the elastic sealing means is supported against the surface of the stop means, characterized in that the sealing means includes a lip type sealing ring firmly contacting an inner wall of the annular chamber means, the sealing ring includes a sealing lip guided on the nozzle needle means, and in that means are provided for supporting the sealing ring in a radial direction.

15. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, an elastic sealing means is guided on the nozzle needle means and is arranged in the annular chamber means, and the elastic sealing means is supported against the surface of the stop means, spring means are provided for normally urging the nozzle needle means into a position closing the injection orifice means, means are provided for securing the nozzle body means in a nozzle holder means, and an intermediate member is interposed between the nozzle holder means and nozzle body means for defining a portion of the annular chamber means, and characterized in that the sealing means includes a lip type sealing ring firmly contacting an inner wall of the annular chamber means, the sealing ring includes a sealing lip guided on the nozzle needle means, and in that means are provided for supporting the sealing ring in a radial direction.

16. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, an elastic sealing means is guided on the nozzle needle means and is arranged in the annular chamber means, and in that the elastic sealing means is supported against the surface of the stop means, spring means are provided for normally urging the nozzle needle means into a position closing the injection orifice means, means are provided for securing the nozzle body means in a nozzle holder means, and an intermediate member is interposed between the nozzle holder means and nozzle body means for defining a portion of the annular chamber means, the intermediate member forms the surface of the stop means against which the elastic sealing means is supported, and characterized in that the sealing means includes a lip type sealing ring firmly contacting an inner wall of the annular chamber means, the sealing ring includes a sealing lip guided on the nozzle needle means, and in that means are provided for supporting the sealing ring in a radial direction.

17. A fuel injection nozzle according to one of claims 14, 15 or 16 characterized in that the means for supporting the sealing ring in a radial direction includes a ring member disposed above the sealing lip.

18. A fuel injection nozzle according to claim 17, characterized in that the ring member is a metallic ring member vulcanized into the lip type sealing ring.

19. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, an elastic sealing means is guided on the nozzle needle means and is arranged in the annular chamber means, and in that the elastic sealing means is supported against the surface of the stop means, spring means are provided for normally urging the nozzle needle means into a position closing the injection orifice means, means are provided for securing the nozzle body means in a nozzle holder means, and an intermediate member is interposed between the nozzle holder means and nozzle body means for defining a portion of the annular chamber means, the elastic sealing means includes an elastic ring member and a supporting ring combined into a single structural unit, and characterized in that the supporting ring simultaneously forms a mounting ring held in a cylindrical recess of the nozzle body means.

20. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, an elastic sealing means is guided on the nozzle needle means and is arranged in the annular chamber means, and in that the elastic sealing means is supported against the surface of the stop means, spring means are provided for normally urging the nozzle needle means into a position closing the injection orifice means, means are provided for securing the nozzle body means in a nozzle holder means, and an intermediate member is interposed between the nozzle holder means and nozzle body means for defining a portion of the annular chamber means, the intermediate member forms the surface of the stop means against which the elastic sealing means is supported, the elastic sealing means includes an elastic ring member and a supporting ring combined into a single structural unit, and characterized in that the supporting ring simultaneously forms a mounting ring held in a cylindrical recess of the nozzle body means.

21. A fuel injection nozzle for an internal combustion engine, the fuel injection nozzle including a nozzle body means, an injection orifice means provided in the nozzle body means, a nozzle needle means displaceably guided in the nozzle body means for controlling the injection orifice means, an annular chamber means provided in the nozzle body means on a side of the nozzle needle means opposite the injection orifice means, and a stop means provided in the annular chamber means for limiting a displacement of the nozzle needle means, an elastic sealing means is guided on the nozzle needle means and is arranged in the annular chamber means, and the elastic sealing means is supported against the surface of the stop means, the elastic sealing means includes an elastic ring member and a supporting ring combined into a single structural unit, characterized in that the supporting ring simultaneously forms a mounting ring held in a cylindrical recess of the nozzle body means.

* * * * *